Figure 17:
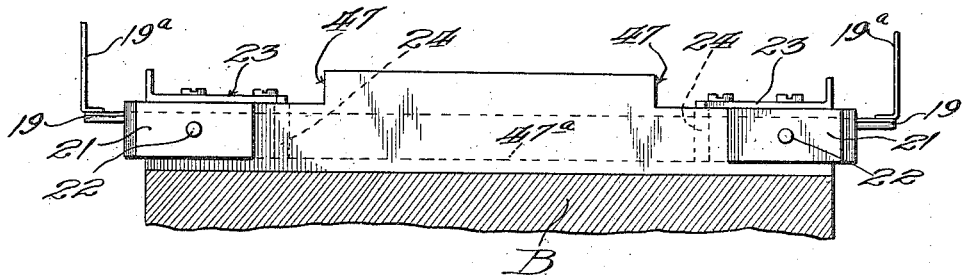

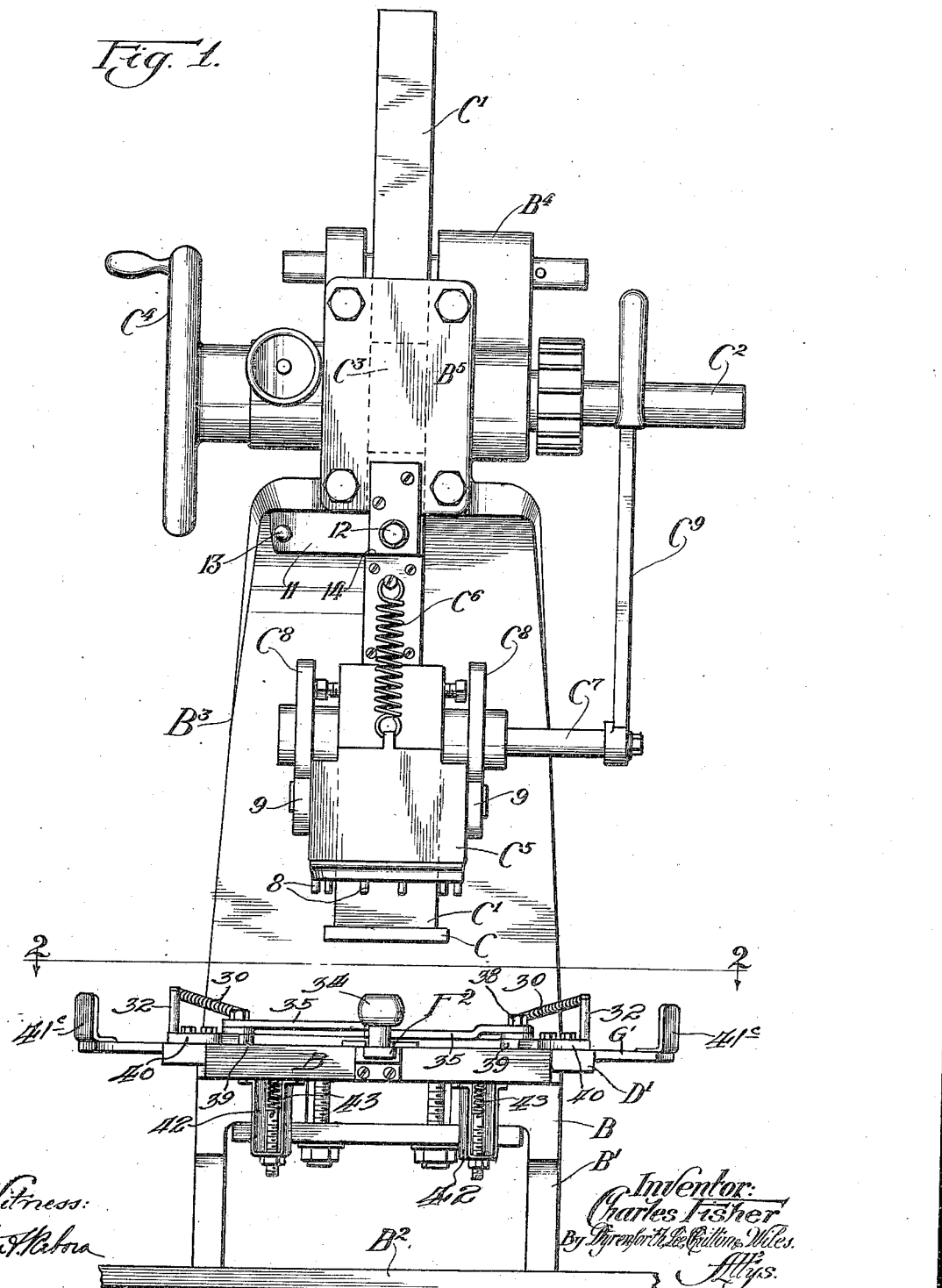

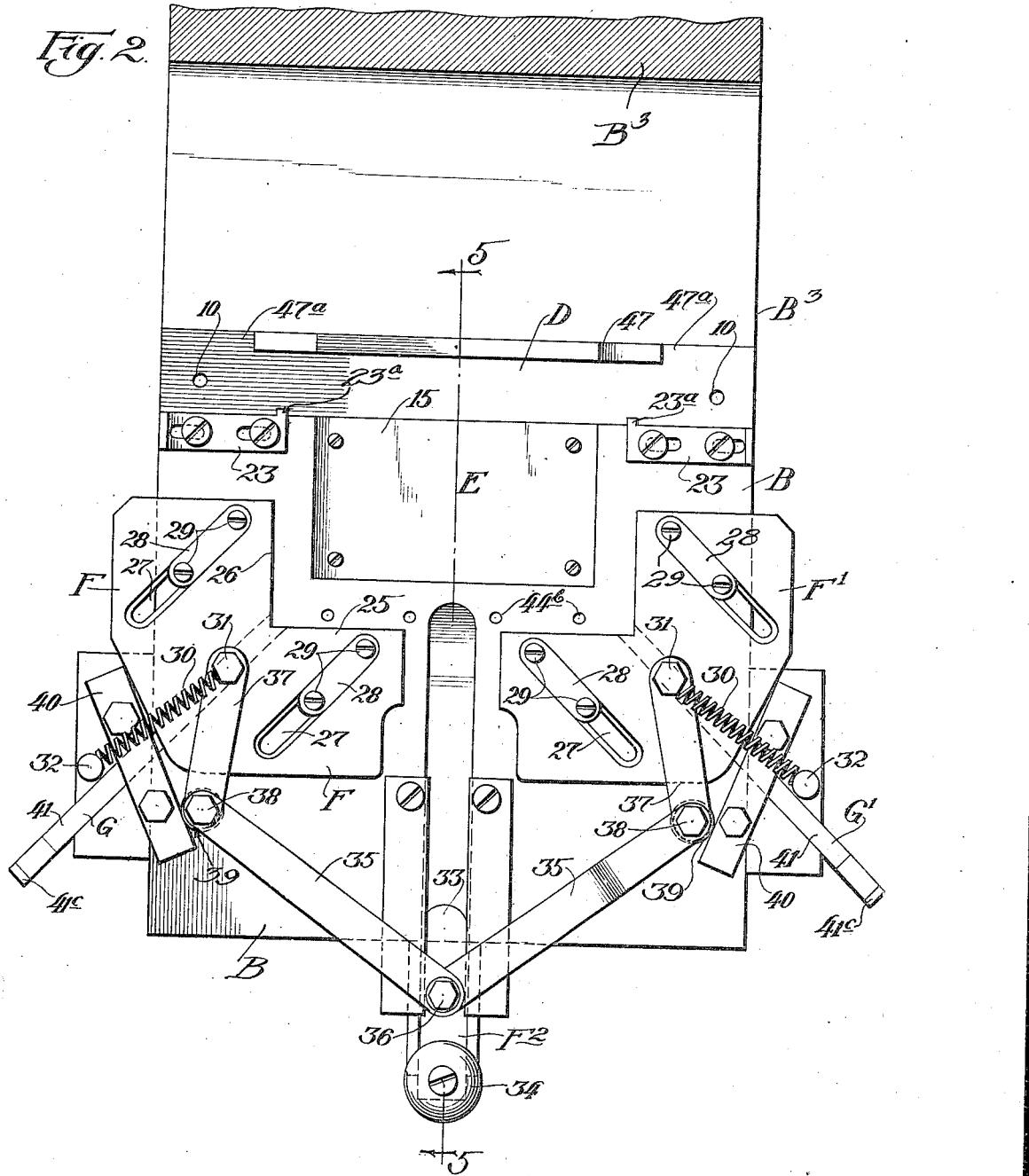

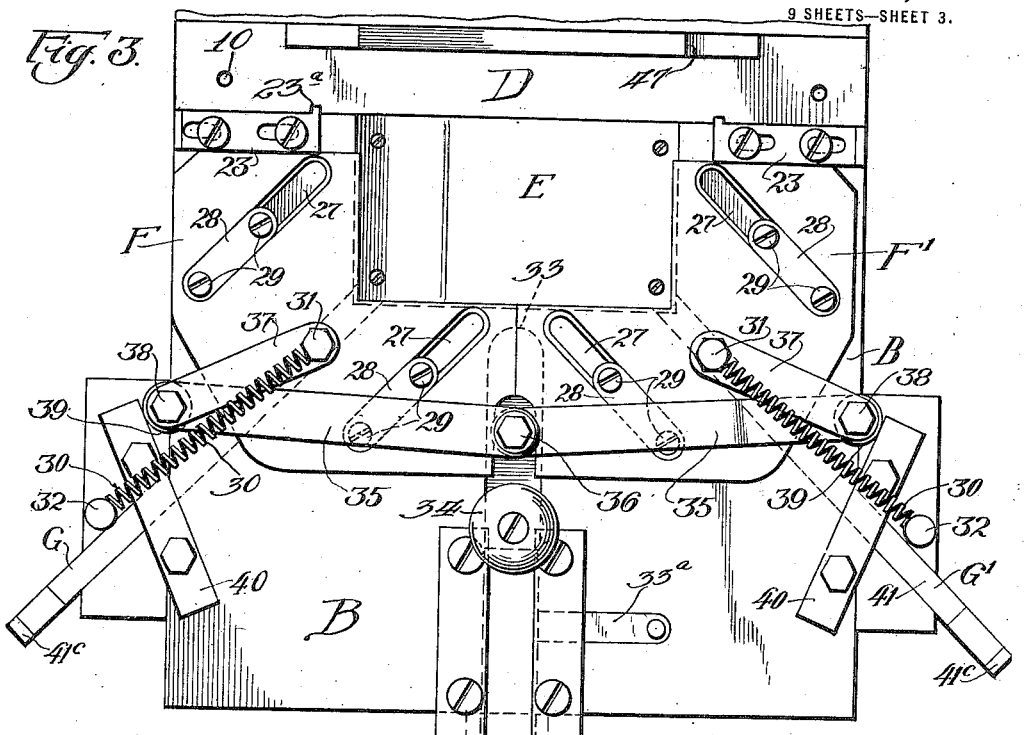

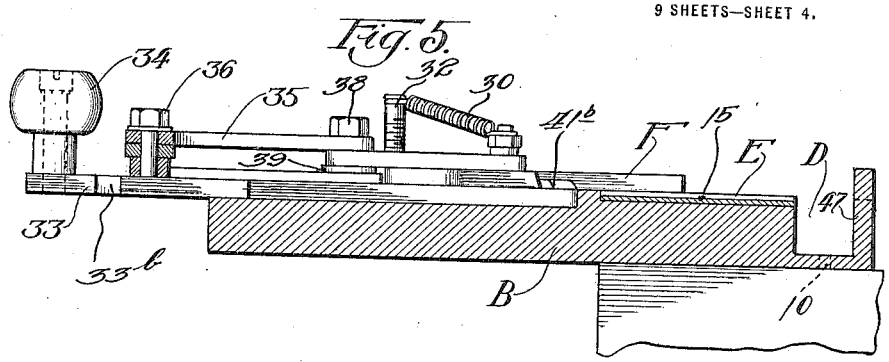
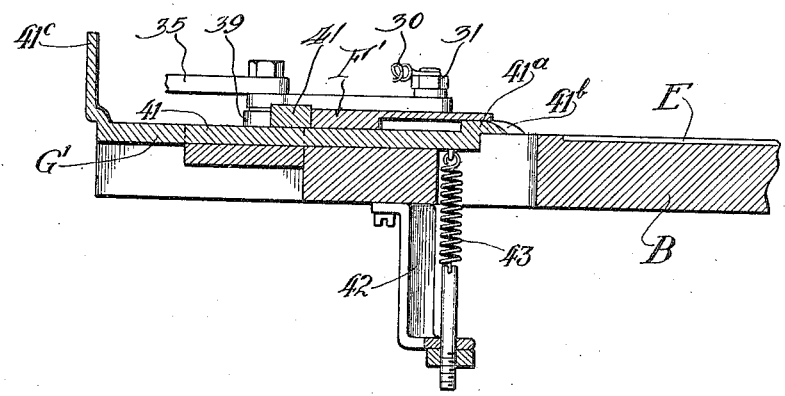
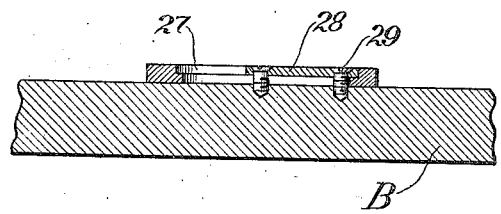

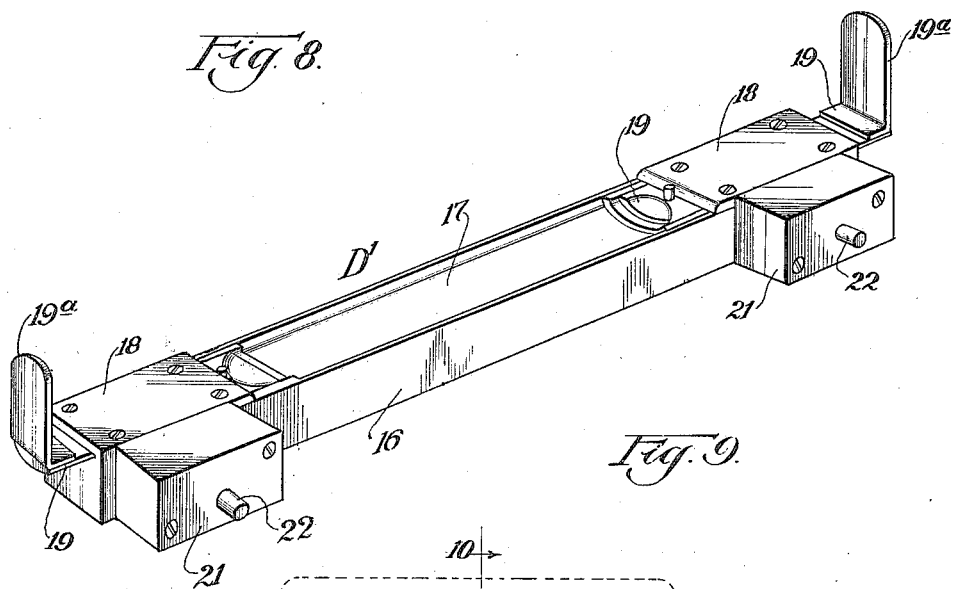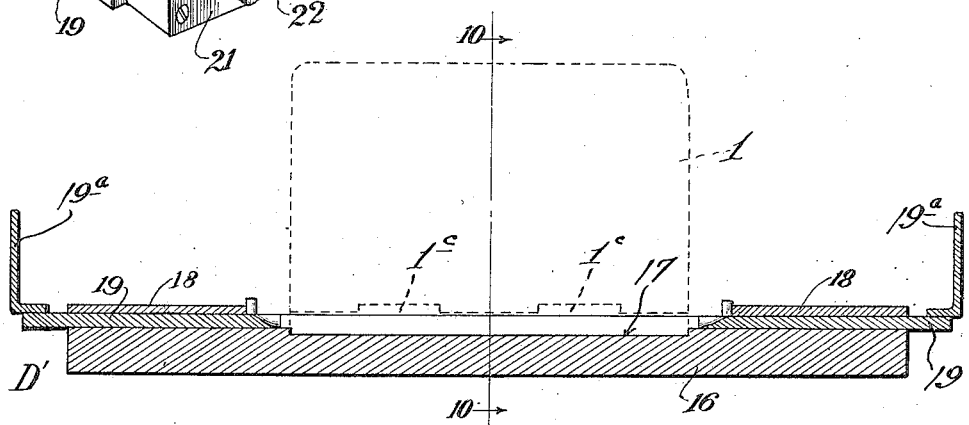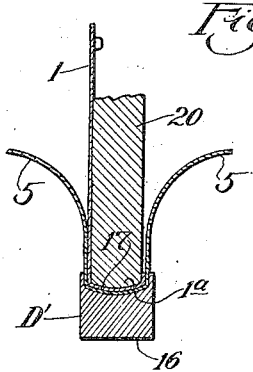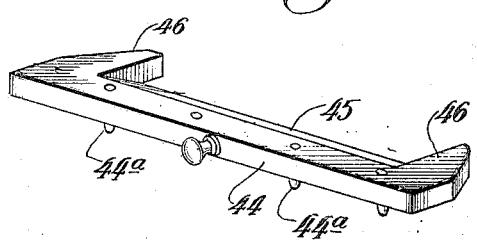

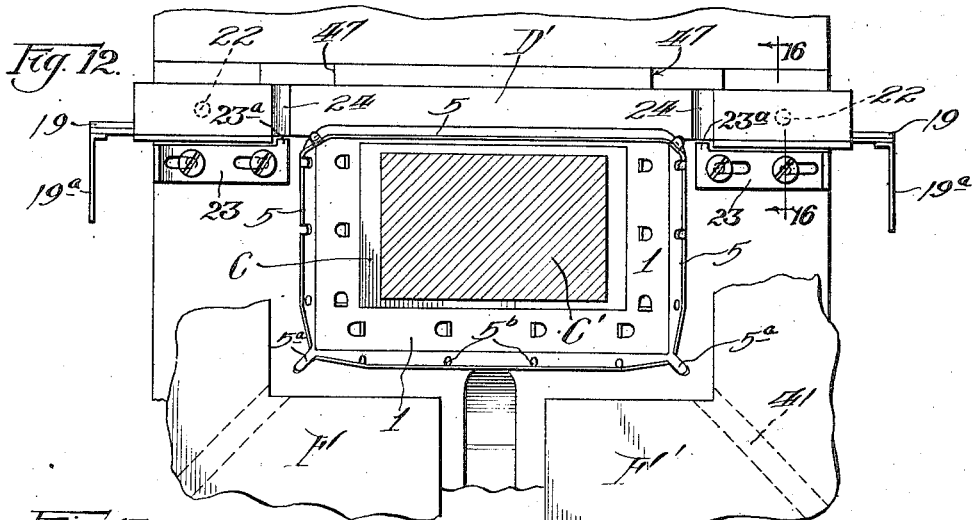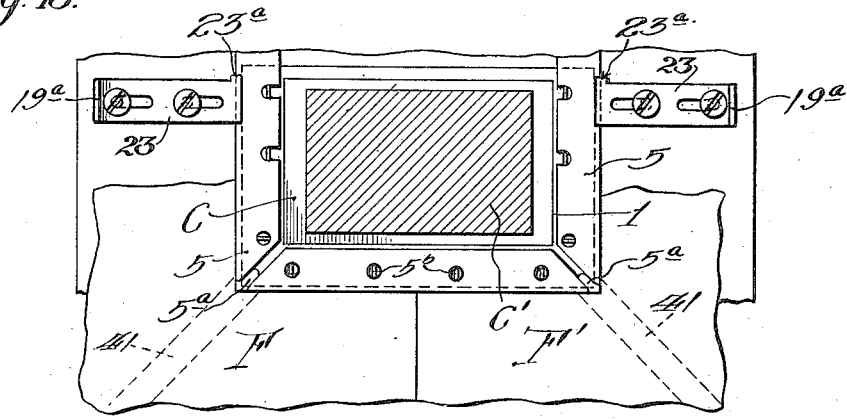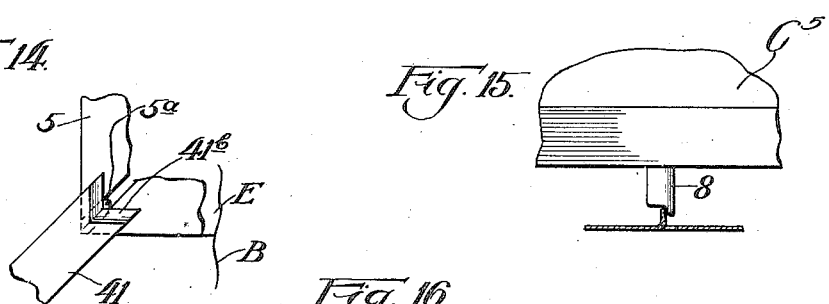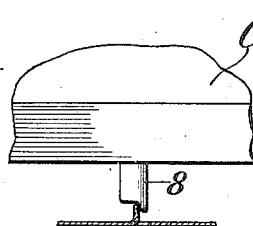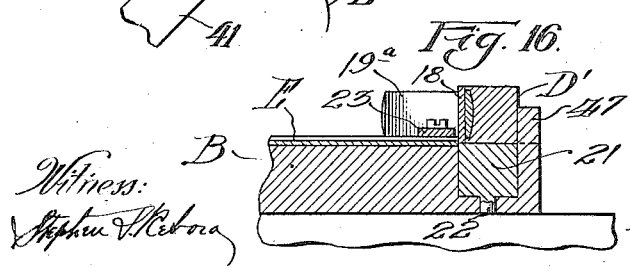

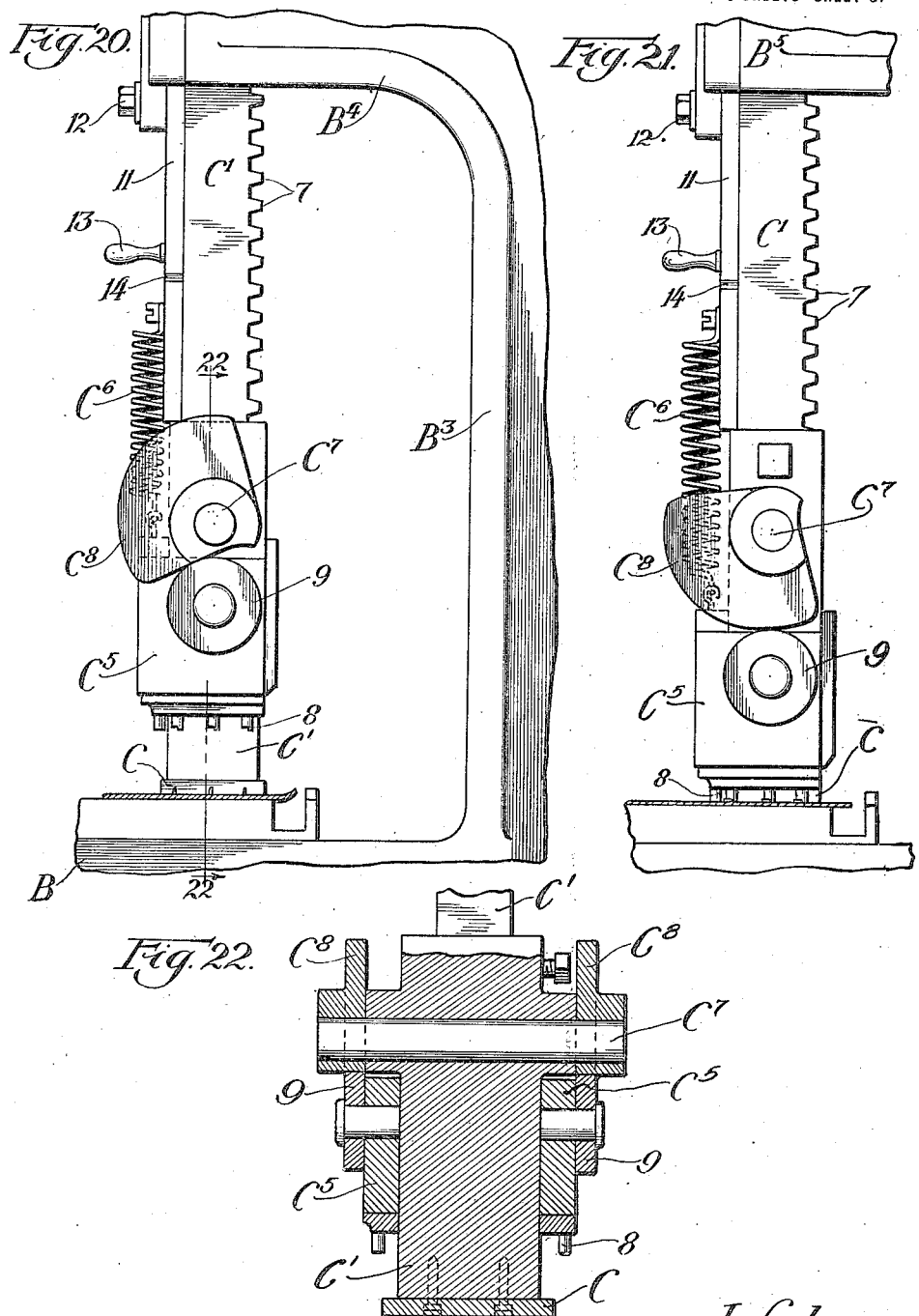

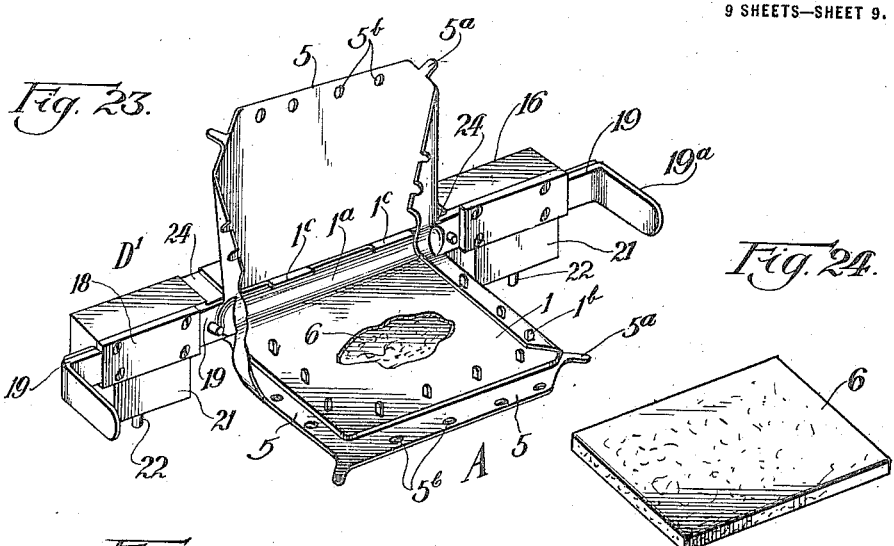

UNITED STATES PATENT OFFICE.

CHARLES FISHER, OF CHICAGO, ILLINOIS, ASSIGNOR TO THE AUTOMATIC RECORDING SAFE COMPANY, OF CHICAGO, ILLINOIS, A CORPORATION OF ILLINOIS.

MACHINE FOR MANUFACTURING SAFES.

1,424,289.   Specification of Letters Patent.   Patented Aug. 1, 1922.

Application filed May 7, 1921. Serial No. 467,703.

*To all whom it may concern:*

Be it known that I, CHARLES FISHER, a citizen of the United States, residing at Chicago, in the county of Cook and State of Illinois, have invented a new and useful Improvement in Machines for Manufacturing Safes, of which the following is a specification.

The present invention relates to a machine for use in manufacturing book-form safes, or so called library safes; and the primary object is to provide a machine which will enable a savings bank of the character hereinafter described to be conveniently and cheaply manufactured. The improved machine is adapted for the purpose of assembling previously maunfactured parts and applying a flexible cover, such as artificial leather or other suitable fabric.

A savings bank, for the manufacture of which the present machine is adapted, is shown in finished condition in Fig. 29 of the accompanying drawings; and parts entering into the construction are shown in Figs. 23 to 28 inclusive. A brief description of such a savings bank at this point will enable a description of the drawings to be more readily understood. The savings bank is designated A, and is made to closely simulate the appearance of a book, the savings bank being covered with a binding of leather or suitable fabric. The savings bank comprises a sheet metal member which forms one side wall 1, and the curved back 1$^a$ of the safe-casing; a peripheral U-form sheet metal member 2, usually of brass of angular cross section which is adapted to be secured to the inner surface of the side plate 1 and connected with the marginal portion thereof by means of clenching lugs 1$^b$, the member 2 being provided with an inturned attaching flange 2$^a$ supplied with slots or perforations 2$^b$ for receiving the clenching lugs 1$^b$, the member 2 being further provided with locking means 2$^c$; a sheet metal member 3 adapted to serve as a closure and constituting one side wall of the casing, the plate 3 being provided with clenching lugs 3$^a$ disposed near its edges; a U-form member 4 of angular cross section and having an inturned flange 4$^a$ provided with slots or recesses 4$^b$ adapted to receive the clenching lugs 3$^a$, the member 4 being provided at its edge portion with a locking member 4$^c$ adapted to interlock with the locking mechanism 2$^c$ of the member 2; and a flexible cover 5 adapted to serve as a binding for the safe. The flexible cover 5 has its corner portions cut away and provided with oblique tabs 5$^a$ which are adapted to fold over the corner portions of the plates which constitute the sides of the casing. The marginal portions of the cover 5 are provided with perforations 5$^b$ which are adapted to engage the clenching lugs after the marginal portions of the cover have been folded over the edges of the side plates. The rear portion of the side plate 3 is adapted to pivot on the upper edge of the curved back 1$^a$ of the main casing section. Said back 1$^a$ is provided with lugs 1$^c$; and the plate 3 is provided at its rear edge with lugs 3$^b$ which are adapted to engage the upper edge of the curved back 1$^a$. The plate 3 pivots on the upper edge of the back 1$^a$, and the lugs 1$^c$ and 3$^b$ interlock to hold the plate 3 in proper position, no pintle being required. The plate 3 is equipped near its rear edge with a spring 3$^c$ which is adapted to engage a catch or projection 1$^d$ with which the plate 1 is provided on its interior surface near the back of the casing. The interlocking of the spring 3$^c$ with the catch 1$^d$ is effected when the closure 3 is closed after the assembling of the parts of the safe is completed. The member 2, which preferably is of brass and which may be given a silk finish, corresponds with the gilt edges of the leaves of a book. Pads 6 which may be of cotton batting or felt are interposed between the outer surfaces of the side walls of the safe and the flexible cover.

The preferred embodiment of the invention for assembling the parts of the safe and appyling a cover thereto is shown in the accompanying drawings, in which—

Figure 18:
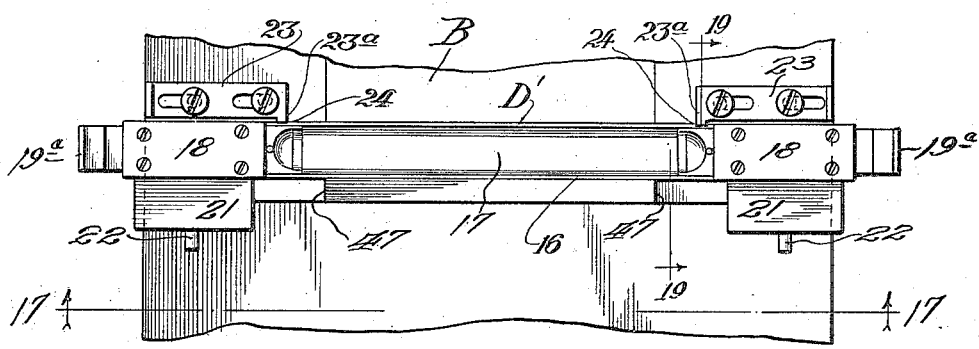
Figure 19:
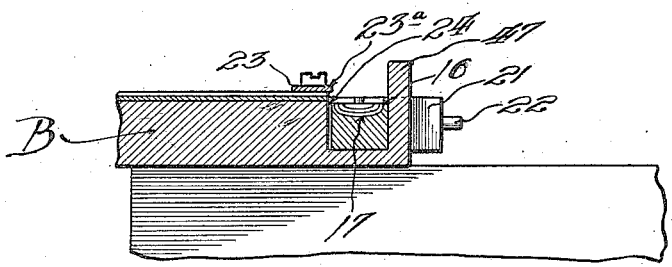

Figure 1 represents a front elevational view of the improved machine, or press; Fig. 2, a broken plan sectional view taken as indicated at line 2 of Fig. 1 and showing the bed of the press and the attendant means for effecting folds of the marginal portions of the cover of the safe; Fig. 3, a broken plan view showing the folder-plates in their inner position; Fig. 4, a broken plan view showing the folder-plates retracted and a cover-holding member in position, this member being employed preparatory to inserting the closure-plate 3, which is done after the assembly shown in Fig. 6 is introduced into the press; Fig. 5, a broken vertical sectional view taken as indicated at line 5 of Fig. 2; Fig. 6, a broken vertical sectional view taken as indicated at line 6 of Fig. 4, this view showing a corner ironing member employed for folding and pressing the tabs $5^a$ over the corners of the metal; Fig. 7, a broken sectional view taken as indicated at line 7 of Fig. 4 and showing a detail of one of the guides of the presser-members; Fig. 8, a perspective view of a safe-holder, or die, which is adapted to be introduced into a suitable socket in the bed of the press in the position illustrated in Figs. 12 and 23 to enable the peripheral member 2 of the safe to be applied to the side plate 1, and which is adapted to be turned end for end and also given a quarter turn on its axis to bring it to the position shown in Fig. 26, in which position it can be introduced into the socket in the bed of the press in the manner illustrated in Figs. 17 and 18, preparatory to applying the closure 3 and the peripheral member 4 shown in Figs. 27 and 28; Fig. 9, a longitudinal sectional view of the device shown in Fig. 8, the dotted lines indicating the position of the main portion, or box, of the safe-casing, corresponding with the position shown in Fig. 26; Fig. 10, a section taken as indicated at line 10 of Fig. 9, this view illustrating the manner in which the plate 1 of the safe-casing and the cover for the safe are secured to the holder shown in Fig. 8, this operation being preparatorily done in another press (not shown); Fig. 11, a perspective view of the cover-holding member shown in Fig. 4; Fig. 12, a broken plan view of the bed of the press with the assembly shown in Fig. 23 introduced therein, the stem or plunger of a vertically movable presser-foot with which the press is equipped being shown in section; Fig. 13, a broken view similar to Fig. 12, but showing the presser-members which fold the cover over the edges of the metal in their inner positions; Fig. 14, a broken detail view illustrating the manner in which one of the corner ironers serves to fold a corner tab $5^a$ inwardly over the corner of the metal plate; Fig. 15, a broken elevational view showing one of the clenching dies with which an independently movable outer sleeve-like plunger of the press is equipped at its lower end; Fig. 16, a broken sectional view taken as indicated at line 16 of Fig. 12; Fig. 17, a vertical sectional view taken as indicated at line 17 of Fig. 18 and showing the safe-holder, or die, in the bed of the press in a position corresponding with the position shown in Fig. 26; Fig. 18, a plan view of the part shown in Fig. 17; Fig. 19, a broken vertical section taken as indicated at line 19 of Fig. 18; Fig. 20, a broken side elevational view of the press, showing in section the shaft which actuates the sleeve-like plunger, this view showing the presser-foot in depressed position; Fig. 21, a similar view showing the sleeve-like plunger in depressed position at the end of the clenching operation; and Fig. 22, a broken vertical section taken as indicated at line 22 of Fig. 20.

Continuing the description of the figures of the drawings, Fig. 23 is a perspective view showing the main plate of the safe-casing secured to a holder or die and in position to be introduced into the socket in the bed of the press for the first operation, the view showing one margin of the cover folded over the margin of the plate, however; Fig. 24, a perspective view of one of the pads; Fig. 25, a perspective view of a U-form marginal member of the safe; Fig. 26, a perspective view showing the condition after the main or box portion of the safe has been completed and the assembly is ready to be introduced again into the press in a new position; Fig. 27, a perspective view of the closure-plate of the safe; Fig. 28, a perspective view of the metal binding member of the closure-plate; and Fig. 29, a perspective view of the completed safe in closed and locked condition.

The press comprises a frame which has a bed B supported by short legs B' adapted to rest upon a bench $B^2$, the frame having at its rear portion a heavy standard $B^3$ provided at its upper end with a forwardly extending arm $B^4$ in the front end of which is formed a guide $B^5$; C, a vertically movable presser-foot having a stem C' which works through the vertical guide $B^5$; $C^2$ a shaft journalled in the forward end of the arm $B^4$ and equipped with a pinion $C^3$ (shown in dotted lines in Fig. 1) which works in a rack 7 with which the rear side of the plunger stem C' is provided, thus serving to raise and lower the plunger, the shaft $C^2$ being equipped with an actuating handle $C^4$; $C^5$, a sleeve-like plunger or slide which works on an enlarged portion of the stem C' of the presser-foot C, the member $C^5$ being equipped at its lower end with studs, dies or punches 8 which serve to bend the clenching lugs in the manner shown in Fig. 15; $C^6$, a spring connecting the slide $C^5$ with the plunger C' and tending to hold the slide $C^5$ a certain distance above the presser-foot C; $C^7$, a rock-shaft journalled in the stem C' and equipped with a pair of cams $C^8$ which serve, through the medium of rollers 9 on the slide $C^5$, to depress said slide when the clenching operation is to be performed; $C^9$, a handle through the medium of which the rock-shaft $C^7$ may be actuated; D, a socket which extends transversely across the bed of the press and is adapted to accommodate a die or holder D'; E, a shallow socket or recess in the bed of the press, which is adapted to accommodate (one at a time) the plates constituting the sides of the safe; F and F', a pair of angular folder-plates which are adapted to move obliquely on the bed of the press and project at their inner angular edges slightly over the recess E, as illustrated in Fig. 3; F², mechanism for actuating said folder-plates; and G and G', a pair of corner irons moving in oblique guides with which the bed of the press is provided, the folder-plates F and F' serving as the upper walls of said guides.

The frame of the press may be of any suitable construction. The form shown, which will be readily understood from Figs. 1 and 20 is a convenient form. The bed B has a flat upper surface over which the folder-plates F and F' are adapted to slide. As shown in Fig. 5, the socket D comprises a transverse slot which is cut in the rear portion of the bed; and this slot is intersected at its upper portion by the rear portion of the plate-receiving recess E. In other words, the rear end of the recess E is open to the socket D, so that a plate held in the holder inserted in the socket D can project into the recess E. Near the ends of the socket D are provided holes or small sockets 10 (Fig. 2) which are adapted to receive studs with which the holder D' is equipped, when said holder is entered in the socket in one of the two positions which it is adapted to occupy in the socket.

The construction and operation of the presser-foot C and clencher C⁵ will be readily understood from the brief description given. By means of the shaft C², actuated by the wheel C⁴, the inner plunger may be depressed to lower the presser-foot onto a safe-plate contained in the socket E; and after the necessary preparation is made, the clencher C⁵ may be lowered by means of the rock-shaft C⁷ to clench the lugs of the plate which are employed for securing parts of the safe together. Before the clencher C⁵ is operated and after the presser-foot has been lowered, the presser-foot is locked in the lowered position by means of a pivoted member or dog 11. This member is supported on a pivot 12 carried by the lower end of the guide B⁵, and is provided with a knob 13 by means of which the member 11 may be swung from the horizontal position shown in Fig. 1 to a vertical depending position so that the free end of the member 11 will engage a shoulder 14 with which the stem C' is equipped at its front side. This will be understood from Figs. 1 and 20. Having locked the presser-foot in its depressed position, the rock-shaft C⁷ may be actuated to force the clencher C⁵ downwardly, thus performing the clenching operation. This action is shown in Fig. 21.

The bottom of the shallow plate-receiving socket E is preferably equipped with a brass plate 15.

The die or safe-holder D' is shown as comprising an elongated piece of metal 16 of substantially rectangular cross section. This is provided on one side, however, with an elongated concavity 17 which is adapted to receive the rounded back 1ᵃ of the safe. The bar 16 is equipped at its ends with guides 18 in which are mounted slides 19 having concavo-convex inner ends which are adapted to slide over the ends of the curved back 1ᵃ and thus secure the plate 1 in the holder in the manner shown in Fig. 23. The slides 19 are provided with finger pieces 19ᵃ by means of which they may be actuated. In another press (not shown) the cover 5 is folded about the back of the plate 1 in the manner shown in Fig. 10, this being accomplished by means of a plunger 20. After the margins of the cover have been folded over the ends of the back 1ᵃ, the slides 19 are shoved inwardly, thus securing the plate 1 and the folded cover in the die or holder D'.

The plate 16 is further equipped at one side near its ends with blocks 21 from which project studs 22. These studs are adapted to enter the holes 10 shown in Fig. 2 when the holder D' is inserted in the socket E in the position shown in Fig. 12, corresponding also with the position shown in Fig. 23.

The bed plate B is equipped near its lateral edges with slides 23 which are disposed adjacent the ends of the socket D. These slides are adapted to be shoved inwardly to the position shown in Fig. 13 to clamp the margins of the cover over the margins of the plate 1 after the holder and plate have been inserted in the bed of the press. The slides 23 are provided at their inner ends with short rearwardly projecting lugs 23ᵃ. When the slides 23 are retracted, the holder D' may be inserted in the socket D in the position shown in Fig. 18, the bar 16 being provided with small grooves 24 which slidably engage the projections 23ᵃ during the movement of insertion. After the holder is completely entered in this socket, the slides 23 may be shoved inwardly to clamp the margins of the cover over the margins of the safe-plate.

Each of the folder-plates F and F' is of angular form, presenting a front wing 25 and a side wing 26. The plates are provided with oblique guide slots 27 which are engaged by guide strips 28 secured to the bed by screws 29. A detail is shown in Fig. 7. The inner edges of the wings 25 and 26, which are at right angles to each other, are adapted to fold the margins of the cover over the margins of the safe-plate in the manner shown in Fig. 13. The folder-plates F and F' are moved outwardly by means of strong coil springs 30 whose inner ends are secured to studs 31 on the folder-plates and whose outer ends are secured to studs 32 carried by the bed of the press. The slides F and F' are moved inwardly by means of mechanism F². This comprises a forwardly and rearwardly movable slide 33 which is equipped with an actuating handle 34; a pair of oblique links 35 having their front ends pivotally connected with the slide F² by means of a stud 36; and a pair of oblique links 37 whose rear ends are pivotally connected with the studs 31, and whose front ends are connected with the rear ends of the links 35 by means of pivots 38. The pivots 38 are equipped with rollers 39 which are adapted to travel along the inner edges of oblique guide members or cams 40 which are fixedly mounted on the bed of the press. It will be noted that as the slide 33 is moved rearwardly, it will swing the front ends of the links 37 outwardly; and as the rollers 39 travel on the cams 40, the folder-members F and F' will be shoved inwardly. The slide 33 may be locked in projected position by a slide 33ª which is adapted to engage a recess 33ᵈ in the side of the slide 33, see Fig. 5.

The corner-ironers G and G' are mounted in the manner shown in detail in Fig. 6. Each of said members comprises a long bar 41 which moves in an oblique guide slot with which the bed of the press is provided in its upper surface, the bars 41 being confined in their guide slots by the folder-plates F and F', and also by the strips 40. The inner ends of the bars 41 are offset upwardly, as indicated at 41ª in Fig. 6; and the extremities of these upwardly offset portions are provided with crotches 41ᵇ, as shown in Fig. 14, the crotches being beveled at their upper sides. The lower sides of the crotched ends are adapted to slide over the safe-plate and iron the tabs 5ª of the cover over the corners of the plate, as will be understood from Figs. 3 and 14. As shown in Fig. 6, the bed of the press is equipped with depending brackets 42 with which are connected the lower ends of coil springs 43 whose upper ends are secured to the inner end portions of the bars 41 of the corner-ironers. The bars 41 are provided at their outer ends with finger pieces 41ᶜ by means of which the ironers may be shoved inwardly. The springs 43 are adapted to retract the ironers and are also adapted to hold the inner ends of the ironers down so that they will iron the tabs 5ª closely over the corners of the safe-plate.

As shown in Figs. 4 and 11, there is provided a cover-holding bar 44 which is adapted to be applied at the front end of the socket E for the purpose of holding the cover 5 properly stretched over the socket E while the closure-plate 3 is being introduced, after the assembly shown in Fig. 26 has been introduced into the press. The bar 44 is equipped on its lower side with studs 44ª which are adapted to enter sockets 44ᵇ with which the bed of the press is provided just in front of the plate-socket E. The bar 44 has a rear beveled edge 45, and has short rearwardly extending angularly projections 46 at its ends. After the assembly shown in Fig. 26 has been introduced into the press, the bar 44 is applied; the closure-plate 3 is then introduced; and by means of a thin metal plate (not shown), a pad 6 may then be introduced between the plate 3 and the cover 5. The thin plate for introducing the pad may then be withdrawn, after which the bar 44 may be removed; and the presser-foot of the press may then be lowered to clamp the plate 3 in the socket E, thus folding the margins of the cover upwardly. After this, the folder-plates F and F' and the corner-ironers G and G' may be shoved inwardly; the margins of the cover may then be hooked over the clenching lugs 3ª; the peripheral U-form plate 4 may then be applied so that the clenching lugs 3ª will extend through the slots 4ᵇ; and the clencher C⁵ of the press may then be lowered to clench the lugs.

The rear wall of the socket D is designated 47. This wall rises somewhat above the level of the top of the bed B, thus forming a stop against which the holder D' may strike, as a matter of convenience in entering the holder in the socket. The ends of the wall 47 are cut away as indicated at 47ª (Fig. 2) thus affording recesses adapted to accommodate the blocks 21 when the assembly shown in Fig. 26 is inserted in the press. When the holder D' is thus inserted in the socket, the inner end surfaces of the blocks 21 contact with the end edges of the wall 47.

It will be evident from Fig. 23 that when the assembly there shown is to be introduced into the press, it is desirable to have the safe-plate 1 disposed in such a horizontal plane that it will rest on the bottom of the shallow plate socket E. The blocks 21 are of the proper thickness to accomplish this result, it being noted that these blocks rest on the bottom of the socket D, and thus elevate the bar 16 to the proper plane so that the plate 1 and this covering will rest in the plate-socket E. After the main casing section of the safe has been completed, the assembly is turned end for end and given a quarter turn on the axis of the holder, thus producing the position shown in Fig. 26. When the assembly shown in Fig. 26 is introduced in the press the bar 16 drops into the socket D, thus lowering the back portion 1ª to a position corresponding approximately with the bottom of the plate-socket E, so that the closure-plate 3 can be introduced and the plate 3 and its cover will then rest in the socket E. The manner of folding and stretching the cover over the edges of the plate will be readily understood from the illustration in the drawings and from the description thus far given. It may be added however that the small slides 23 with which the bed of the press is equipped immediately in front of the socket D are shoved in to make the first folds over the rear portion of the safe-plate and clamp the cover at those points, after which the folder-plates F and F' may be actuated to fold the margin of the cover over the edges of the plate, and the corner-ironers G and G' may then be operated to fold the tabs 5ª over the corners of the plate.

After the operations have been completed, the safe comprises a box form receptacle and a closure-plate which pivots on the upper edge of the back of the receptacle. The spring 3ᶜ will tend to hold this closure in the open position. When the closure is forced to the closed position however, the locking means 2ᶜ of the peripheral member 2 of the main casing will automatically engage the locking member 4ᶜ of the peripheral member 4 of the closure, so that the closure will be locked in the closed position. The safe may be unlocked by means of a key inserted through a key barrel 48 constituting a portion of the locking mechanism 2ᶜ. The member 2 is also shown equipped with coin-admission means 49.

It will be understood that a cover 5 for the safe is preparatorily blanked, embossed and printed as may be desired. After the safe is completed, it presents the appearance of a neatly bound book, with padded covers; and the peripheral member 2 which usually is of brass and may be given a silk finish, closely simulates the appearance of the gilt edges of a book.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent is:

1. In a press for the purpose set forth, the combination of a bed provided with a holder-socket and with a plate-socket, a safe plate-holder adapted to said first named socket, means adapted to hold the safe-plate in the second named socket, and a clencher adapted to serve in securing a marginal member to the safe-plate.

2. In a press for the purpose set forth, the combination of a bed provided with a plate-holder socket and provided also with a plate-socket, a safe plate-holder adapted to said first named socket, means for depressing the plate and holding it in said second named socket, folder devices adapted to fold the margins of a cover over the edges of the plate, and a clencher adapted to serve in securing a marginal member to said plate over the infolded margins of the cover.

3. In a press for the purpose set forth, the combination of a bed provided with a plate-holder socket and provided with an adjoining plate-socket, a safe plate-holder adapted to said first named socket, a presser-foot adapted to be lowered onto the plate to force the same into said plate-socket, and folders associated with said bed and adapted to fold the margins of a cover over the edges of a plate in said socket.

4. In a press for the purpose set forth, the combination of a bed provided with a plate-holder socket and provided with an adjoining plate-socket, a safe plate-holder adapted to said first named socket, a presser-foot adapted to be lowered onto the plate to force the same into said plate-socket, folders associated with said bed and adapted to fold the margins of a cover over the edges of a plate in said socket, and a sleeve-like clencher adapted to work over said presser-foot and serving in effecting the clenching of lugs for securing a marginal member to the safe-plate.

5. In a machine of the character set forth, the combination of a bed provided with a holder-socket and with an adjacent plate-socket, folder devices associated with said bed, a plunger carrying a presser-foot, means for raising and lowering said plunger, a sleeve-like clencher surrounding said plunger, and means mounted on said plunger for actuating said clencher.

6. In a machine of the character set forth, the combination of a bed provided with a holder-socket and with an adjacent plate-socket, folder devices associated with said bed, a plunger carrying a presser-foot, means for raising and lowering said plunger, a sleeve-like clencher surrounding said plunger, and a cam-equipped rock-shaft journalled in said plunger and serving to depress said clencher after the presser-foot has been lowered onto the safe-plate.

7. In a machine of the character set forth, the combination of a bed provided with a plate-socket and equipped with folders adapted to fold the margins of a cover over the margins of a plate confined in said socket, a vertically movable presser-foot, means for actuating the same, a clencher mounted to move with the presser-foot, and actuating means for the clencher carried by the stem of said presser-foot.

8. In a machine of the character set forth, the combination of a bed provided with a plate-socket and equipped with folders adapted to fold the margins of a cover over the margins of a plate confined in said socket, a vertically movable presser-foot, a rack and pinion device for actuating said presser-foot, a sleeve-like clencher slidably mounted on the stem of the presser-foot, and means mounted on the stem of the presser-foot for depressing the clencher after the presser-foot has been lowered.

9. In a machine of the character set forth, the combination of a bed provided with a shallow plate-socket, holders adapted to slide on the upper surface of said bed and fold the margins of the cover over the margins of a plate confined in said socket, a vertically movable plunger adapted to press a plate into said socket, and a clencher movably mounted on said plunger and equipped with depending clencher studs adapted to work outside the foot of the plunger and to serve in effecting the clenching of lugs to secure a marginal member to the plate confined in said socket.

10. In a machine of the character set forth, the combination of a bed provided with a holder-socket and with an adjacent plate-socket, a pair of folder slides movably mounted on the bed adjacent said holder-socket and adapted to be projected over the margins of the plate-socket at points adjacent the holder-socket, folder plates movably mounted on the bed and adapted to fold the margins of a cover over plate confined in said socket, a plunger adapted to depress the plate into said plate socket and hold the same in position, and a clencher associated with said plunger.

11. In a machine of the character set forth, the combination of a bed provided with a holder-socket and with an adjacent plate-socket, a safe plate-holder adapted to said first named socket, a plunger adapted to depress a plate into said plate-socket, a clencher associated with said plunger, and a pair of obliquely moving folder plates adapted to fold the margins of a cover over the margins of a plate confined in said socket.

12. In a machine of the character set forth, the combination of a bed provided with a holder-socket and with an adjacent plate-socket, a safe plate-holder adapted to said first named socket, a plunger adapted to depress a plate into said plate-socket, a clencher associated with said plunger, and a pair of obliquely moving folder-plates provided with angular inner edges adapted to be projected over the margins of a plate confined in said socket.

13. In a machine of the character set forth, the combination of a bed provided with a holder-socket and an adjacent plate-socket, a plunger adapted to depress a plate into said plate-socket, a clencher associated with said plunger, folder-plates adapted to fold the margins of a cover over the margins of a plate confined in said socket, and corner-ironers adapted to fold the corner tabs of the cover over the corners of the plate in said socket.

14. In a machine of the character set forth, the combination of a bed provided with a plate-socket adapted to receive a safe-plate which is provided at its margin with upwardly projecting clenching lugs, folder-plates associated with said bed and adapted to fold the margins of a cover over the margins of the safe-plate, a plunger adapted to press the safe-plate and its cover into the plate-socket and hold the same securely in position, and a clenching device associated with said plunger and adapted to effect clenching of the lugs of the safe plate.

15. In a machine of the character set forth, the combination of a bed provided with a safe plate-socket, a pair of angular folder-plates mounted to slide obliquely on said bed, a forwardly and rearwardly movable slide mounted on the bed, link connections between said slide and said folder-plates, means coacting with said link connections for forcing the folder-plates inwardly when said slide is moved rearwardly, means for depressing a plate into said plate-socket, and means for effecting clenching of lugs with which the marginal portions of the plate are provided.

16. In a machine of the character set forth, the combination of a bed provided with a holder-socket and with an adjacent plate-socket, a safe plate-holder adapted to said first named socket, folder devices mounted on the bed adjacent to said first named socket, a pair of obliquely slidable folder-plates mounted on the bed, means for actuating said folder-plates, a pair of obliquely disposed corner-ironers working beneath said folder-plates, a plunger adapted to depress the safe-plate into said plate-socket, and a clencher associated with said plunger and adapted to effect the clenching of lugs with which the marginal portions of the safe-plate is provided.

17. In a machine of the character set forth, the combination of a bed provided with a holder-socket and with an adjacent plate-socket, folder devices associated with the plate-socket and adapted to fold the marginal portions of a cover over the marginal portions of a plate, a reversible safe plate-holder adapted to said first named socket, a plunger adapted to depress the safe-plate into the plate-socket, and a clencher associated with said plunger and adapted to effect clenching of lugs with which the marginal portions of the safe-plate are equipped.

18. In a machine of the character set forth, the combination of a bed provided with a holder-socket and with an adjacent plate-socket, folder devices associated with the plate-socket, and a reversible safe plate-holder having one surface equipped with a recess for receiving the portion of the plate which corresponds with the back of the safe and equipped also with means for securing the back portion of the safe-plate in said recess.

19. In a machine of the character set forth, the combination of a bed provided with a transverse slot affording a holder-socket and provided also with an adjacent shallow plate-socket, and a safe plate-holder comprising a bar equipped on one side with means for holding the back portion of a safe-plate and equipped on its side at right angles thereto with blocks adapted to enter said holder-socket, said bar being also adapted to enter said holder-socket when the holder is in another position.

20. In a machine of the character set forth, the combination of a bed provided with a transverse slot adapted to serve as a holder-socket and provided also with an adjacent plate-socket, a safe plate-holder equipped with means for holding the back portion of a safe-plate, said holder being adapted to be supported in said first named socket at a given point of elevation when in one position and at a higher point of elevation in another position, folder-plates associated with said plate-socket, a plunger adapted to depress the safe-plate into said plate-socket and hold it therein, and a clencher associated with said plunger.

21. In a machine of the character set forth, the combination of a bed provided with a transverse slot adapted to serve as a holder-socket and provided also with an adjacent plate-socket, a safe plate-holder equipped with means for holding the back portion of a safe-plate, said holder being adapted to be supported in said first named socket at a given point of elevation when in one position and at a higher point of elevation in another position, a plunger adapted to depress the safe-plate into said plate-socket and hold it therein, and a clencher associated with said plunger.

22. In a machine of the character set forth, the combination of a bed provided with a transverse slot adapted to serve as a holder-socket and provided in front of said slot with a shallow plate-socket, the rear wall of said slot rising above the plate-socket and having cut-away end-portions and a safe-plate holder equipped with blocks adapted to be received at the cut-away portions of said rear wall when the holder is in one position, said blocks being adapted to fit into the holder-socket when the holder is in another position, whereby the holder is adapted to occupy different positions with respect to elevation in the holder-socket.

23. In a machine of the character set forth, the combination of a bed provided with a holder-socket and with an adjacent shallow plate-socket, a pair of obliquely moving folder-plates mounted on said bed, a cover-holding bar adapted to be removably mounted on the bed between said folder-plates, a plunger adapted to depress a safe-plate into the plate-socket and hold it therein, and a sleeve-like clencher mounted on said plunger and equipped with actuating means carried by the plunger.

24. In a machine of the character set forth, the combination of a bed provided with a holder-socket and with an adjacent plate-socket, a pair of folder-plates mounted to slide on said bed and project over the margins of the plate-socket, springs tending to hold said folder-plates in retracted position, means for forcing the folder-plates inwardly, a holder adapted to said first-named socket and serving to carry a safe-plate, a plunger adapted to depress the safe-plate into the plate-socket, a sleeve-like clencher movably mounted on said plunger, and means mounted on the plunger for actuating said clencher.

25. In a machine of the character set forth, the combination of a bed provided with a holder-socket and a plate-socket, folder devices associated with said plate-socket, a safe plate-holder adapted to said first named socket, a plunger adapted to depress the safe-plate into the plate-socket, a sleeve-like clencher mounted on said plunger, a spring tending to hold said clencher in elevated position on the plunger, and actuating means mounted on the plunger for depressing the clencher with relation to the plunger.

26. In a machine of the character set forth, the combination of a bed provided with a holder-socket and a plate-socket, folder devices associated with said plate-socket, a safe plate-holder adapted to said first named socket, a plunger adapted to depress the safe-plate into the plate-socket, means for lowering said plunger and locking it in depressed position, a sleeve-like clencher mounted on the plunger, and means mounted on the plunger for depressing the clencher with relation to the plunger.

27. In means of the character set forth, a safe plate-holder comprising an elongated bar provided on one side with a depression adapted to receive the back of a safe-plate, and means mounted on said bar for clamping the back portion of a safe-plate in said depression.

28. In a machine of the character set forth, the combination with a holder-socket, of a holder comprising a bar adapted to fit into said socket when the holder is in one position, projections extending from the end portions of one side of said bar and adapted to fit into said socket when the holder is in another position, and means mounted on the end portions of said bar for securing the back portion of a safe-plate to the bar.

29. In a machine of the character set forth, the combination of a bed provided with a slot adapted to serve as a holder-socket and provided adjacent said slot with a shallow recess adapted to serve as a plate-socket, a pair of folder-slides mounted on the bed adjacent the holder-socket and equipped with projections extending over the holder-socket, and a safe plate-holder adapted to be received in said first named socket, said holder having grooves adapted to accommodate said projections when the folder-slides are in retracted position.

CHARLES FISHER.